United States Patent [19]

Gaillard et al.

[11] Patent Number: 4,516,300

[45] Date of Patent: May 14, 1985

[54] APPARATUS AND A METHOD FOR ASSEMBLING SLATS OF A VENETIAN BLIND

[75] Inventors: Adrianus J. C. Gaillard, Zwijndrecht, Netherlands; Richard N. Anderson, Owensboro, Ky.

[73] Assignee: Hunter Douglas International N.V., Curacao, Netherlands Antilles

[21] Appl. No.: 518,911

[22] Filed: Aug. 1, 1983

[51] Int. Cl.³ ............................................ B23P 19/04

[52] U.S. Cl. ................................................ 29/24.5

[58] Field of Search ...................................... 29/24.5

[56] References Cited

U.S. PATENT DOCUMENTS

| | | | |
|---|---|---|---|
| 3,736,631 | 6/1973 | Edixhoven | 29/24.5 |
| 3,766,815 | 10/1973 | Edixhoven | 29/24.5 |
| 3,824,657 | 7/1974 | Nilsson | 29/24.5 |
| 4,073,044 | 2/1978 | Edixhoven | 29/24.5 |
| 4,145,797 | 3/1979 | Walsh | 29/24.5 |
| 4,188,693 | 2/1980 | Edixhoven | 29/24.5 |
| 4,420,862 | 12/1983 | Edixhoven | 29/24.5 |

*Primary Examiner*—Howard N. Goldberg
*Assistant Examiner*—Steven Nichols
*Attorney, Agent, or Firm*—Pennie & Edmonds

[57] ABSTRACT

An apparatus and a method for assembling the slats of a venetian blind in which slats are fed in turn into the venetian blind ladders and are raised to a first position sequentially to form, at that first position, a stack of assembled slats. The length of stroke of the lifting mechanism, preferably a linear motor, is restrained by an abutment which is removed as the last slat of a stack is being lifted, so that the whole stack is then lifted to a higher position at which it is retained and the ladders are moved past the slat feed point so that no slats are inserted therein. The next stack of slats is then formed at the first position and before it is completed, the ladder means are cut between the first and second positions.

11 Claims, 5 Drawing Figures

APPARATUS AND A METHOD FOR ASSEMBLING SLATS OF A VENETIAN BLIND

FIELD OF THE INVENTION

The invention relates to an apparatus and to a method for assembling the slats of a venetian blind in the ladder means of the blind. Such ladder means usually include side ladder cords or tapes with rungs spanning these side cords or tapes. The rungs can either be single cords or tapes or multiple cords or tapes in which latter case the slat is sometimes inserted between two rungs of a multiple rung pair.

Several prior art devices have been suggested for assembling the slats to engage the rungs of the ladder means. One such device is disclosed in U.S. Pat. No. 4,073,044 in the name Edixhoven. The construction disclosed in this Edixhoven Patent includes a vertically disposed flap pivoted at its bottom and having a ladder guide along one face. A louvre or slat is inserted horizontally between the two vertical side cords or stringers and between two adjacent rungs thereof. The flap lying to one side holds the ladder obliquely such that the rung above the slat is to one side of the hole therethrough. The slat is then lifted and a vertical needle for inserting a lifting cord or chain enters the hole as the louvre is lifted. This lifting motion also lifts the ladder to cause the flap to pivot and flap over to a position on the other side of the hole so that the next accepted rung will be on the other side of the hole and the needle. The assembly operation continues and results in the rungs of the ladder being disposed alternately on opposite sides of the lifting cord or chain.

Such an apparatus is perfectly satisfactory and works very well for the manufacture of individual blinds. Having assembled the slats in the ladder means, the thus formed assembly is assembled with a headrail and, where appropriate, provided with a bottom rail. For this purpose, the ladder means are cut and the loose end of the ladder means supply has to be fixed to the apparatus before starting each new blind assembling operation.

The object of the present invention is to provide an apparatus and a method for assembling of the slats of venetian blinds in order to speed up and facilitate a higher production rate and more efficiency in the operation of the slat-forming machine, for example, and not by way of limitation, of the type disclosed in the Edixhoven Patent.

SUMMARY OF THE INVENTION

The invention p,ovides an assembly apparatus for assembling slats of a venetian blind in the ladder means of the blind, said apparatus comprising, in combination:

(a) a first guide for guiding a slat or slat material in a slat feed direction;

(b) at least two assembly stations, each assembly station including:

(i) a second guide for guiding slats assembled in said ladder means in a direction transverse to said feed direction;

(ii) a lifting element for moving each slat, after assembly into said ladder means in said transverse direction along said second guide, to a first position and by a distance effective to align the next rung of the ladder means with the first guide;

(iii) first retaining means to retain slats so lifted in said first position;

(iv) drive means to move said lifting element;

(v) control means to control the drive means effective to cause them to move said lifting element only by said distance, to move a slat to said first position;

(vi) intermittently operable means to over-ride said control means, effective to enable said drive means to lift a stack of slats held by said first retaining means to a second position located therebeyond and by a distance whereby several rungs of the ladder means move past the level of said first guide; and (vii) second retaining means at said second position to retain a stack of slats so lifted to said second position.

The apparatus of the present invention is capable of producing a normal stack of blind slats assembled in the ladder means and then moves the thus formed stack as a whole to a separate higher position and several of the rungs of the ladder means do not have slats inserted in the rungs but are advanced during this specific lifting operation. This stack of slats is then retained at the second higher position so that it can be subsequently removed. That portion of the ladder means which does not have slats inserted therein can be cut after the forming of a second stack at the first position has begun and the thereby created lower ends can be used for connection with a headrail or with a bottom rail, as appropriate.

The invention also provides a method of assembling the slats of a venetian blind in the ladder means of the blind, said method comprising the steps of:

(a) providing a slat feed guide;

(b) positioning at least two ladder means with a rung of each ladder means aligned with said slat feed guide;

(c) feeding a slat or slat material to engage said so positioned rungs to assemble the slats in the ladder means and in the case of slat material subsequently cutting the slat length;

(d) lifting said assembled slat so that the next rung of each ladder means is aligned with said slat feed guide;

(e) retaining the lifted slat at said position;

(f) feeding a subsequent slat into the rungs aligned with said slat guide;

(g) repeating steps (c) through (f) several times to produce at said first position a first stack of slats;

(h) lifting the thus formed first stack to a second position located beyond said first position and by a distance whereby several rungs of the ladder means move past the level of said first guide without slats being fed thereto;

(i) retaining the stack of slats at said second position;

(j) repeating at least once the steps (b) through (e) to commence the formation of a second stack at the first position;

(k) cutting the ladder means between said first and second positions; and (l) removing the first stack of slats from said second position, when required.

Thus, after said stack engages said second retaining means, a second stack is formed at the first position, the slats of which are fed into the apparatus, lifted by the lifting means to the first position and held there by said first retaining means. In this way one can effectively continuously operate the slat forming apparatus of the invention and one can, after cutting the ladder means, move the stack at the second position while the second stack is being produced, without the time-consuming step of fixing the free cut ends of the ladder means supply to the apparatus in the proper position. That function has been taken over by the first slat of the subsequent stack retained at the first position. The removed stack can then immediately be assembled into a headrail or alternatively it can be placed in store. Such an arrangement enables one to produce so-called "stock blinds" which are sold as a series of selected standard sizes. In fact the stacks can have varying numbers of slats therein so that blinds of various heights can efficiently be assembled.

Preferably the first and second retaining means each comprise resiliently operable pawls mounted on the second guide and in order to cater for different lengths of ladder means in which the slats are not inserted, the location of these pawls can advantageously be adjustable.

The control means advantageously comprise a retractable abutment movable in the operable position, into the path of said lifting element, effective to restrain movement of the lifting element and the intermittently operable means comprise means to retract said abutment which can, for example, be an electromagnetically operated abutment pin. The abutment pin can be controlled to give the facility of controlling the number of slats in each individual stack.

Adjustment of the position of the retractable abutment is advantageously provided for. The lifting element may have an adjustable stroke limiter mounted thereon which is engageable with the retractable abutment to give fine adjustment of the stroke of the lifting element to said first position.

While other means are contemplated to drive the lifting element, the drive means desirably is in the form of a linear motor having a stroke bar connected to the lifting element. Such a linear motor has the advantage that a simple abutment pin in the travel path of the slat lifting device is sufficient to control lifting operation. During the blocking of the motion of the lifting element, the linear motor simply runs idle.

BRIEF DESCRIPTION OF THE DRAWINGS

In the following, a presently preferred embodiment of the invention will be described in more detail, by way of example, with reference to the drawings, in which.

DETAILED DESCRIPTION OF THE INVENTION

Figure 1:
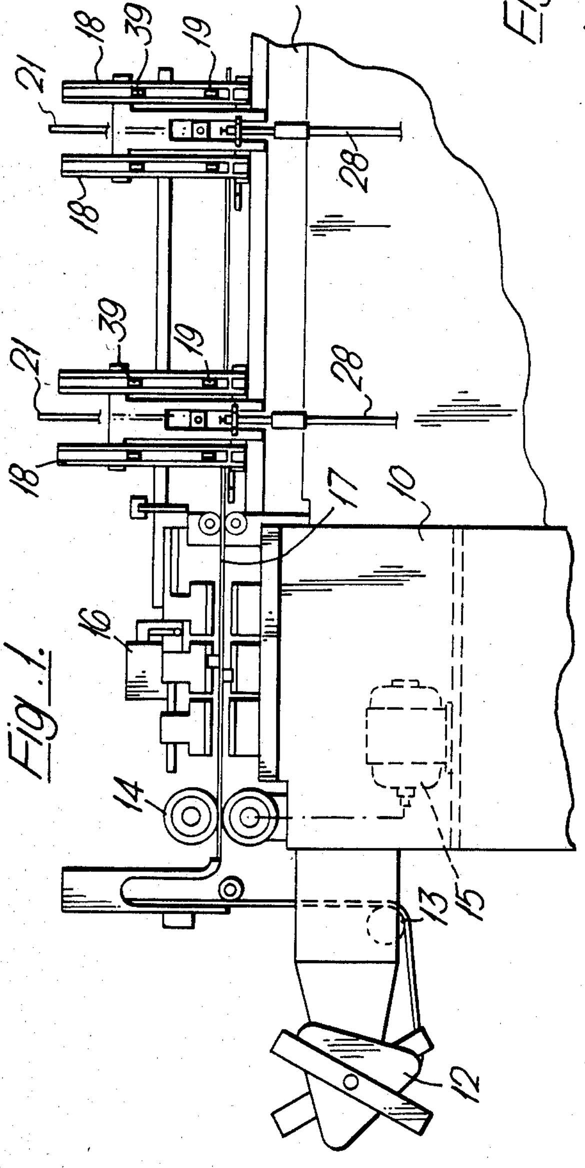
FIG. 1 is a schematic elevation of a portion of a machine for making the slats and which is directly adjacent an assembly apparatus according to the invention for making up the stacks of slats.

The apparatus illustrated comprises a machine platform 10 and an assembly rack or frame 11. On the platform 10 is mounted a supply wheel 12 of coiled sheet metal for slats. This is passed by way of rollers 13 to a first pair of rolls 14 driven by a motor 15. The strip of sheet then passes through a fixture 16 in which it is straightened and formed to the desired concave-convex strip cross-section. Also in fixture 16 the holes required for threading the lifting member are punched and the strips of sheet metal are trimmed to the particular desired length, thus completing the several slats 17. The parts directly associated with the machine on platform 10 are not discussed further herein because they are not related to the present invention. This is just by way of example as the invention relates to an assembling apparatus and such apparatus can also be fed with ready made punched and cut slats from a slat supply by a suitable slat feeding device. the form and method of material feed does not form part of the present invention.

The assembly rack 11 has two vertical U-shaped suspension members 18 having an inside dimension to match the width of a slat 17. On the inner side of the suspension members 18 there are resiliently urged pawls 19 forming first retaining means to retain slats so lifted in a first position. When a slat is lifted upward it forces the pawls 19 outwardly against their spring action and thus the slats 17 pass the pawls 19. When a slat has thus passed above the pawls 19 the springs then urge them inward where they project into the space between the legs of the U of the suspension members 18 and they then serve to retain the slats thereabove.

In the upper part of the assembly rack 11, a fixture 20 is arranged for holding and guiding a needle 21 in a vertical direction. The slats are each so inserted in the suspension members 18 that holes 17*a* for receiving a lift cord and punched in the slots on the machine platform 10 lie exactly beneath the needle 21. The lift cord which may be attached to the tip 21*a* of the needle 21, when all the slats required for one slat stack have been properly assembled with the ladder 23. Alternatively, the needle may have a lengthwise recess 22 in which a lift cord may already be contained before assembly is begun.

Figure 2:
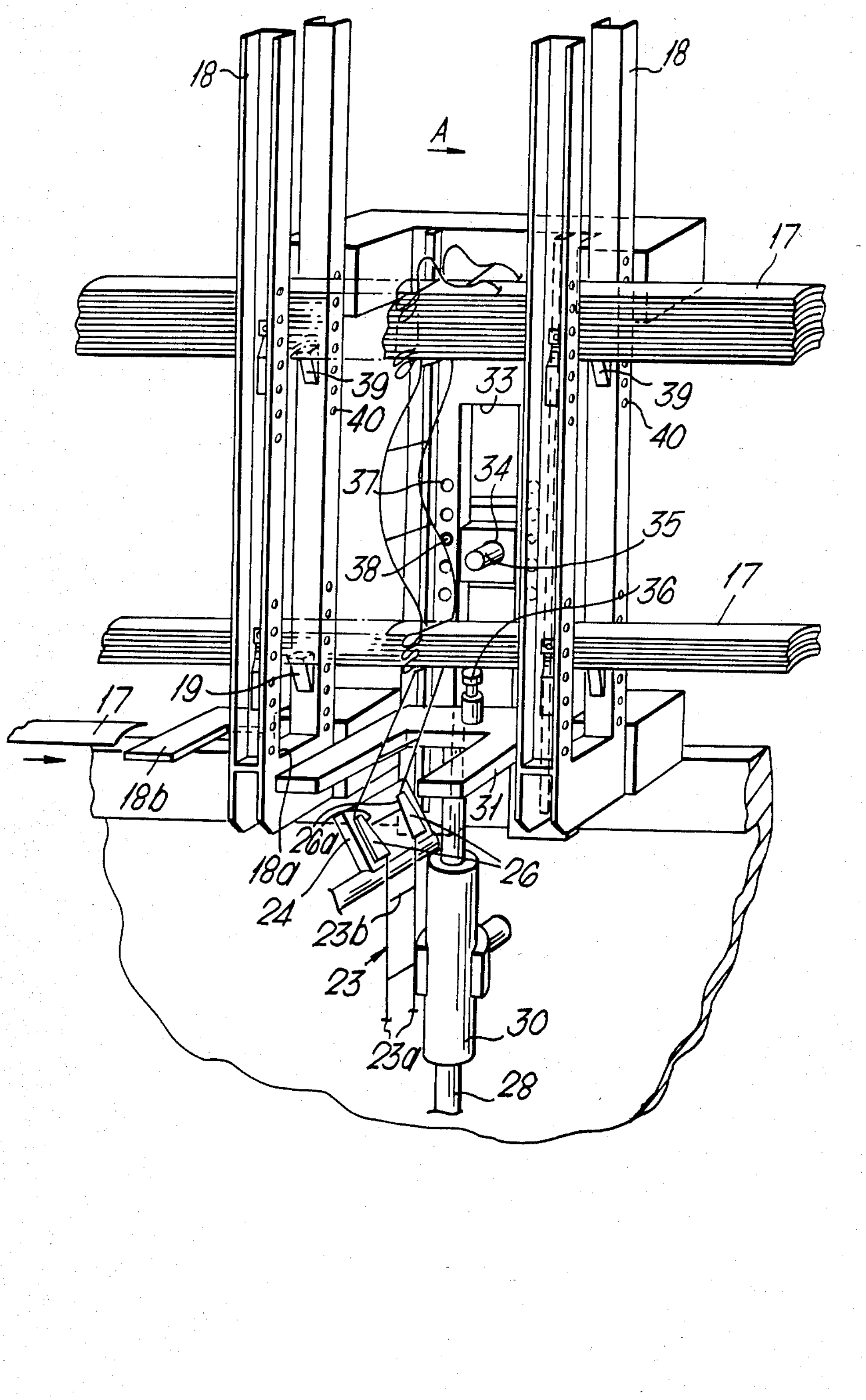
FIG. 2 is an enlarged perspective view of one embodiment of assembly apparatus according to the invention.

The several slats 17 of the blind are held by a ladder 23 preferably, but not necessarily, made up of cords. If the length of the slats is not great, two ladder means 23 will be sufficient; however, for blinds having longer slats, three or more ladders may be provided, more or less evenly spaced over the slat length. For clarity and simplicity only one assembly unit has been shown in FIG. 2, but it will be evident that there must be a unit for each ladder all operating simultaneously, each of which will be identical to the unit shown.

Each ladder 23 comprises two side cords 23*a* and rung cords 23*b* connected between them and arranged at uniform intervals between the side cords 23*a*. These intervals determine the distance between adjacent slats 17 one above the other when the blind is in the lowered or open position.

Beneath the needle 21, a flap 24 is arranged, connected to the assembly at 11 and pivoting on a horizontal axis 24 parallel to the plane of the ladder 23. The flap 24 is provided on one face with two guide plates 26 flanged at the sides. These are so shaped and mounted on the flap 24 that the side cords 23*a* of the ladder 23 can slide between the flap 24 and the plate 26. On their facing sides, the plates 26 have guide rails 26*a* turned towards the flap 24, but not touching it, but rather leaving enough clearance so that the rungs 23*b* can pass between the ends of the rails 26*a* and the flap 24. The distance may be adjusted in a suitable manner. The ladder guiding and spreading device 20 through 36 as described above is indicated merely by way of example and can be replaced by any other guiding and spreading device.

The device so far described is substantially identical with that shown in the abovementioned Edixhoven U.S. Pat. No. 4,073,044. In the construction of the present invention, however, a single vertically movable stroke bar 28 can be driven in vertical movement by a linear motor 30. The stroke bar 28 carries a bifurcated lifting member 30 to lift the slats which are fed into the apparatus by the feed rolls shown in FIG. 1. The slats are guide by the webs 18*a* of the suspension members 18 and by a fixed slat guide 18*b*.

Figure 3:
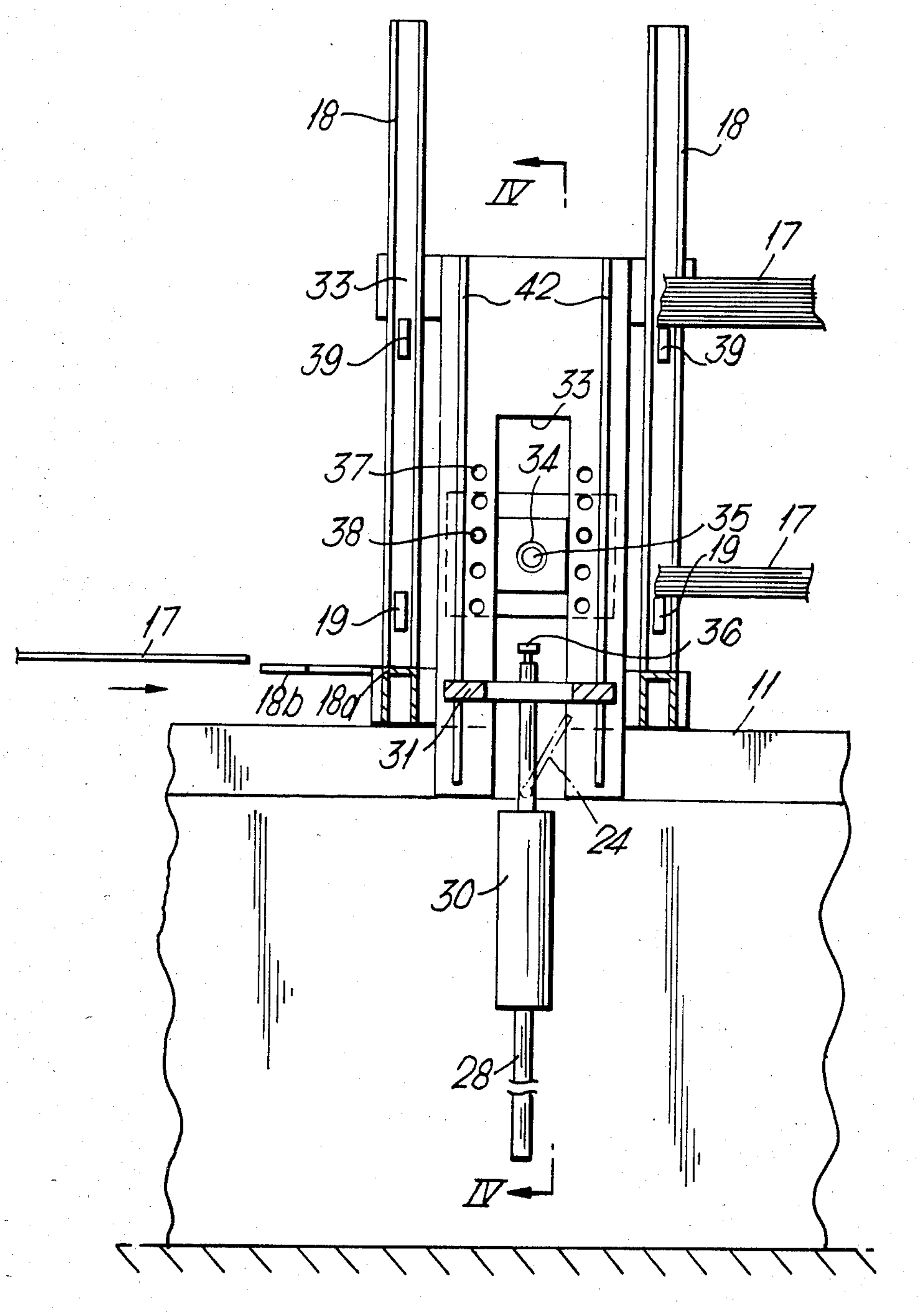
FIG. 3 is a side elevation in the direction of the arrow A in FIG. 2 of a portion of the apparatus of FIG. 2, taken along the line III—III of FIG. 4.
Figure 4:
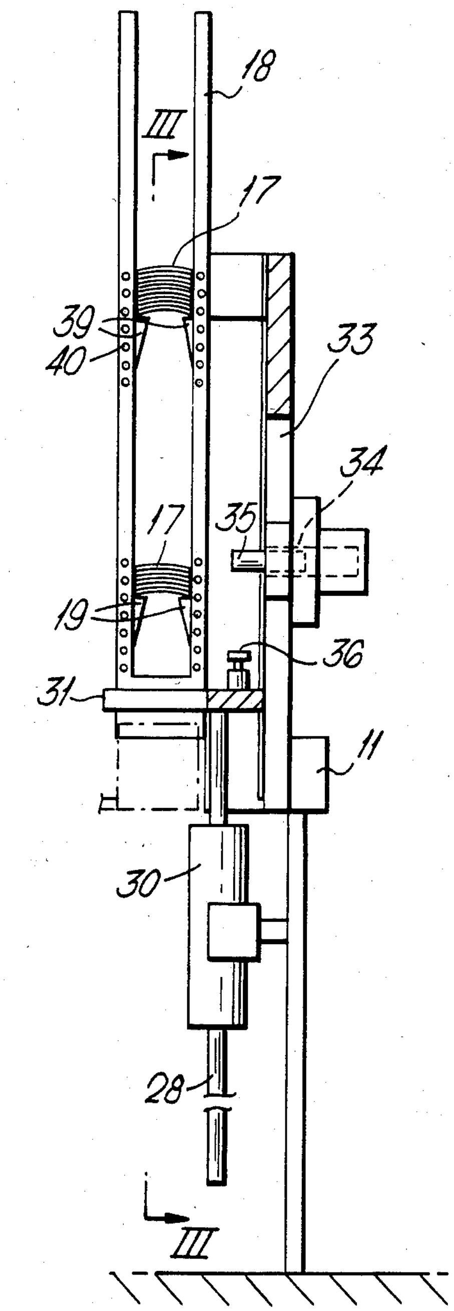
FIG. 4 is a section taken along the line IV—IV of FIG. 3.

Behind the pair of supporting members 18 is located an upstanding frame 33 which is secured at its lower end to the frame 11 and at its upper end the rear arm of each supporting member 18. Mounted on the upstanding frame 33 is an electromagnetic assembly 34 provided with an armature in the form of retractable abutment 35, so that, upon actuation of the electromagnetic, the abutment 35 is withdrawn into the device 34. Mounted on top of the bifurcated lifting element 31, is a threaded stroke limiter 6 positioned to engage the abutment 35 when the latter is in its operating position. Thus, when the linear motor 30 is operated to raise the lifting element 31 the stroke limiter 36 engages the abutment 35 to restrain the vertical movement of the lifting element 31. As can be seen from FIG. 3, the frame 33 is provided with a series of holes 37, on each side, into which can be engaged pins 38 to give a coarse adjustment of the position of the electromagnetic unit 34 and thus of the abutment pin 35.

Upon operation of the electromagnetic unit 34, and retraction of the pin 35, actuation of the linear motor 30 can cause the stroke bar 28 to rise to a much greater height and thereby can cause lifting of a stack of slats to a second position at which it can be retained by second retaining means in the form of further resiliently operable pawls 39. These pawls 39, like the pawls 19, can be adjusted in their position by engagement of pins (not shown) in holes 40 in the guides 18.

Figure 5:
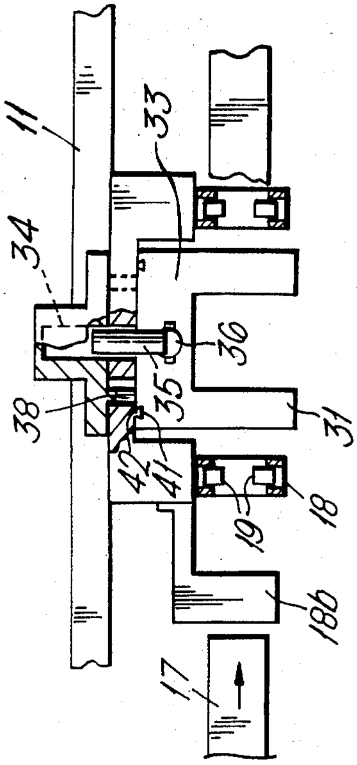
FIG. 5 is a fragmentary plan view of a portion of the apparatus illustrated in FIGS. 3 and 4.

As can be seen in particular from FIG. 5, the actual movement of the lifting element 31 is guided by dovetailed guide elements 42 on the upstanding frames 33 in cooperating dovetailed cutouts 41 in the lifting element 31.

The operation of the apparatus of the present invention has some similarity to the operation of the device of the Edixhoven U.S. Pat. No. 4,073,044 insofar as the operation of the feeding of the slats, of the flap 24 and of the needle 21 are concerned and further discussion of this is not deemed necessary herein.

In carrying out the present invention, however, the operation has considerable differences. Slats 17 are fed in, in turn, to engage the first rungs which are positioned in alignment with the slat guide formed by the web 18*a* and by the fixed guide 18*b*. Thus, the slats are engaged on the rungs. The linear motor 30 is then operated to raise the lifting elements 31 and thereby raise the slat and with it the ladder means by an amount equal to the interslat spacing. At this position the slat which has been engaged with a rung on the ladder means is at a first position and is retained by the lower retaining pawls 19. The next rung is then aligned with the slat guide and, with the ladder means in this position, the lifting element is lowered by reverse operation of the linear motor. The next slat is fed in and is then raised, as before, and in turn is engaged under the first slat and held in this position by the retaining means 19. This sequence of operations is repeated until a sufficient number of slats are stacked on the retaining means 19 for one venetian blind. As the final slat of the stack is being raised, the electromagnetic device 34 is operated and the abutment 35 is withdrawn, so that the pin 36 is not impeded and the lifting device continues to rise a sufficient distance for the whole stack of slats which has previously been formed to be raised above the level of the second set of retaining pawls 39. This will therefore cause several rungs of the ladder means to move past the level of the slat guide 18*a*, 18*b* without any slats being fed thereinto.

With the stack of slats retained on the second retaining means 39 the lifting element 31 is lowered by reverse operation of the linear motor, the abutment 35 is moved forward and the operation commences again. At some time during the formation of the second stack, the ladder means are cut between the two sets of retaining means 19, 39 so that a length of ladder cord is left below the first formed stack and above the second stack which is then subsequently going to be formed. These lengths of ladder means can be used to mount the stack of slats on a headrail and to mount a bottom rail at the bottom of the blind.

The number of slats of each stack and the control of the machine operation can be effected by computerized operation control and thus made totally automatic. Simple programming of the required number is adequate for this purpose, thus the number of slats in a stack can be varied at will be the computerized control and the length of movement of the linear motor stroke bar can be adjusted to give the desired length of ladder in which no rungs are inserted.

While the stroke limiter 36 has been shown as an adjustable screwthreaded member, it could take other forms and could be provided with a resilient head to absorb the impact of the abutment or could in fact be made wholly of a resilient material, although this would not provide for such accurate positioning of the lifting element at the top of its stroke.

We claim:

1. An assembly apparatus for assembling slats of a venetian blind in the ladder means of the blind, said apparatus comprising, in combination:

(a) a first guide for guiding slat material in a slat feed direction;

(b) slat feeding means for moving slats through said apparatus;

(c) at least two assembly stations, each assembly station including:

(i) a second guide for guiding a slat or a slat material assembled in said ladder means in a direction transverse to said feed direction;

(ii) a lifting element for moving each slat, after assembly into said ladder means in said transverse direction along said second guide, to a first position and by a distance effective to align the next rung of the ladder means with the first guide;

(iii) first retaining means to retain slats so lifted in said first position;

(iv) drive means to move said lifting element;

(v) control means to control the drive means effective to cause them to move said lifting element only by said distance, to move a slat to said first position;

(vi) intermittently operable means to over-ride said control means, effective to enable said drive means to lift a stack of slats held by said first retaining means to a second position located beyond said first position and by a distance whereby several rungs of the ladder means move past the level of said first guide and effective to disable said slat feeding means during the time said drive means moves said lifting element between said first and second positions; and (vii) second retaining means at said second position to retain a stack of slats so lifted to said second position.

2. Apparatus as claimed in claim 1, wherein said first and second retaining means each comprise resiliently operable pawls mounted on said second guide.

3. Apparatus as claimed in claim 2, and further comprising means permitting adjustment of the position of said pawls.

4. Apparatus as claimed in claim 1, wherein said control means comprise a retractable abutment movable in the operable position, into the path of said lifting element, effective to restrain the movement of said lifting element and wherein said intermittently operable means comprise means to retract said abutment.

5. Apparatus as claimed in claim 4 and further comprising means permitting adjustment of the position of said retractable abutment.

6. Apparatus as claimed in claim 4, wherein said retractable abutment comprises an electromagnetically operated abutment pin.

7. Apparatus as claimed in claim 4 and further comprising an adjustable stroke limiter mounted on said lifting element and engageable with said retractable abutment to give fine adjustment of the stroke of said lifting element to said first position.

8. Apparatus as claimed in claim 1, wherein said drive means comprise a linear motor having a stroke bar connected to said lifting element.

9. A method of assembling the slats of a venetian blind in the ladder means of the blind, said method comprising the steps of:

(a) providing a slat feed guide;

(b) positioning at least two ladder means with a rung of each ladder means aligned with said slat feed guide;

(c) feeding a slat or slat material to engage said so positioned rungs to assemble the slats in the ladder means and in the case of slat material subsequently cutting the slat length;

(d) lifting said assembled slat so that the next rung of each ladder means is aligned with said slat feed guide;

(e) retaining the lifted slat at said position;

(f) feeding a subsequent slat into the rungs aligned with said slat guide;

(g) repeating steps (c) through (f) several times to produce at said first position a first stack of slats;

(h) lifting the thus formed first stack to a second position located beyond said first position and by a distance whereby several rungs of the ladder means move past the level of said first guide without slats being fed thereto;

(i) retaining the stack of slats at said second position;

(j) repeating at least once the steps (b) through (e) to commence the formation of a second stack at the first position;

(k) cutting the ladder means between said first and second positions; and (l) removing the first stack of slats from said second position, when required.

10. A method as claimed in claim 9, wherein after said stack engages said second retaining means, a complete second stack is formed at the first position, the slats of which are fed into the apparatus, lifted by the lifting means to the first position and held there by said first retaining means.

11. A method as claimed in claim 9, wherein said second stack of slats, after completion at the first position, is lifted to and retained at said second position before the first stack is completely removed therefrom.

* * * * *

UNITED STATES PATENT AND TRADEMARK OFFICE

CERTIFICATE OF CORRECTION

PATENT NO. : 4,516,300

DATED : May 14, 1985

INVENTOR(S) : Adrianus J.C. Gaillard and Richard N. Anderson

It is certified that error appears in the above—identified patent and that said Letters Patent is hereby corrected as shown below:

Col. 5, Line 20, change "6" to --36--.

Fig. 5 should appear as follows in order to correct the lead line of numeral 33:

Fig. 5

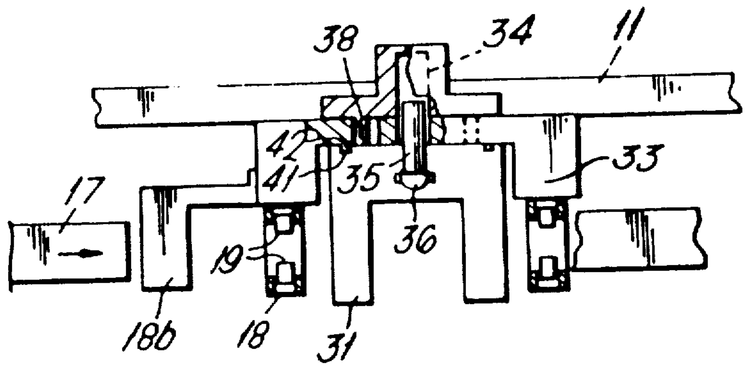

Signed and Sealed this

*Twenty-fourth* Day of *September 1985*

[SEAL]

*Attest:*

DONALD J. QUIGG

*Attesting Officer*

*Commissioner of Patents and Trademarks—Designate*